United States Patent
Ahn

(10) Patent No.: US 11,541,538 B2
(45) Date of Patent: Jan. 3, 2023

(54) ROBOT CLEANER AND CONTROL METHOD THEREOF

(71) Applicant: LG ELECTRONICS INC., Seoul (KR)

(72) Inventor: Seungjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 515 days.

(21) Appl. No.: 16/473,859

(22) PCT Filed: Dec. 8, 2017

(86) PCT No.: PCT/KR2017/014384
§ 371 (c)(1),
(2) Date: Jun. 26, 2019

(87) PCT Pub. No.: WO2018/124534
PCT Pub. Date: Jul. 5, 2018

(65) Prior Publication Data
US 2019/0321979 A1   Oct. 24, 2019

(30) Foreign Application Priority Data

Dec. 27, 2016   (KR) .................... 10-2016-0179847

(51) Int. Cl.
*B25J 9/16*   (2006.01)
*A47L 9/28*   (2006.01)
(Continued)

(52) U.S. Cl.
CPC .......... *B25J 9/1664* (2013.01); *A47L 9/2852* (2013.01); *A47L 9/2873* (2013.01); *B25J 9/0003* (2013.01);
(Continued)

(58) Field of Classification Search
CPC ..... B25J 9/00; B25J 9/0003; B25J 9/16; B25J 9/1656; B25J 9/1664; B25J 9/1674;
(Continued)

(56) References Cited

U.S. PATENT DOCUMENTS

| 9,798,957 B2 * | 10/2017 | Noh ...................... G06K 9/6212 |
| 2007/0050086 A1 * | 3/2007 | Lim ...................... G05D 1/0242 |
| | | 700/245 |

(Continued)

FOREIGN PATENT DOCUMENTS

| JP | H 04-053515 | 2/1992 |
| KR | 10-2004-0087176 | 10/2004 |

(Continued)

OTHER PUBLICATIONS

Australian Office Action dated Jan. 10, 2020 issued in Application 2017385726.
International Search Report (with English Translation) and Written Opinion dated Mar. 14, 2018 issued in Application No. PCT/KR2017/014384.
Extended European Search Report dated Jul. 17, 2020 issued in Application 17885978.1.

*Primary Examiner* — Khoi H Tran
*Assistant Examiner* — Sarah A Tran
(74) *Attorney, Agent, or Firm* — KED & Associates LLP

(57) ABSTRACT

A robot cleaner according to the present invention includes a body provided with a driving unit for movement, a position recognition unit provided in the body to recognize a position of the body, a storage unit configured to store, on a map, a region cleaned while the body is moving by the driving unit, and a control unit configured to control the driving unit, wherein the control unit determines whether a charging stand exists in a cleaning completed region on the map stored in the storage unit when a return condition that the body returns to the charging stand is satisfied, searches for (Continued)

an uncleaned region when the charging stand is not located in the cleaning completed region, and controls the driving unit such that the body moves from a current position to a point in a found uncleaned region or a point around the found uncleaned region.

18 Claims, 14 Drawing Sheets

(51) Int. Cl.
*B25J 9/00* (2006.01)
*B25J 11/00* (2006.01)

(52) U.S. Cl.
CPC .......... *B25J 9/1676* (2013.01); *B25J 11/0085* (2013.01); *A47L 2201/02* (2013.01); *A47L 2201/04* (2013.01)

(58) Field of Classification Search
CPC ........ B25J 9/1676; B25J 11/00; B25J 11/008; B25J 11/0085; A47L 9/28; A47L 9/2836; A47L 9/2852; A47L 9/2868; A47L 9/2873; A47L 2201/00; A47L 2201/02; A47L 2201/04
USPC ....................................................... 700/245
See application file for complete search history.

(56) References Cited

U.S. PATENT DOCUMENTS

| | | | |
|---|---|---|---|
| 2008/0249661 A1* | 10/2008 | Hong | .................... G05D 1/0219 901/1 |
| 2011/0098853 A1 | 4/2011 | Park et al. | |
| 2012/0232738 A1 | 9/2012 | Jeon | |
| 2014/0288709 A1* | 9/2014 | Sim | ........................ B25J 9/0003 700/259 |

FOREIGN PATENT DOCUMENTS

| | | | |
|---|---|---|---|
| KR | 2004-0087176 | | 10/2004 |
| KR | 2008-0090925 | | 10/2008 |
| KR | 2009-0053263 | | 5/2009 |
| KR | 10-2009-0070725 A | | 7/2009 |
| KR | 10-2009-0074545 | | 7/2009 |
| KR | 2009-0074545 | | 7/2009 |
| KR | 10-1281512 | | 7/2013 |
| KR | 10-1403954 | | 6/2014 |
| KR | 10-2016-0059472 | | 5/2016 |
| KR | 2016-0059472 | | 5/2016 |
| KR | 20160059472 A | * | 5/2016 |
| KR | 20160059472 A | * | 5/2016 |

* cited by examiner

ROBOT CLEANER AND CONTROL METHOD THEREOF

CROSS-REFERENCE TO RELATED PATENT APPLICATION

This application is a U.S. National Stage Application under 35 U.S.C. § 371 of PCT Application No. PCT/KR2017/014384, filed Dec. 8, 2017, which claims priority to Korean Patent Application No. 10-2016-0179847, filed Dec. 27, 2016, whose entire disclosures are hereby incorporated by reference.

TECHNICAL FIELD

The present invention relates to a robot cleaner and a control method thereof.

BACKGROUND ART

Generally, cleaners are devices that suck and remove foreign matters on floors. Among the cleaners, a cleaner that automatically performs cleaning is called a robot cleaner.

The robot cleaner sucks foreign matters on floors to perform cleaning while moving by a driving force of a motor driven by a battery. In addition, the robot cleaner includes an obstacle sensor so as to avoid an obstacle while traveling to travel by itself and perform cleaning.

When the battery needs to be charged in the process of cleaning in the robot cleaner, the robot cleaner needs to return to a charging stand.

Korean Patent Publication No. 10-2004-0087176 (published on Oct. 13, 2004), which is a prior art document, discloses an automatic charging system and a return method for a robot cleaner.

According to the prior art document, when a mode of the robot cleaner is switched to a mode for returning to a charging stand, the robot cleaner searches for a position of the charging stand. The robot cleaner receives an infrared signal outputted from the charging stand to detect a direction of the charging stand and an angle with the charging stand.

When the infrared signal generated by the charging stand is not recognized, the robot cleaner moves forward by a predetermined distance in a previous traveling direction and performs wall-following. When the infrared generating means of the charging stand is detected, the robot cleaner detects the exact position of the infrared generating means while moving forward/backward based on the infrared generating means to and performs docking operation.

However, according to the prior art document, when the robot cleaner knows the position of the charging stand in advance, the robot cleaner may move directly toward the charging stand. However, when the robot cleaner does not know the position of the charging stand, the robot cleaner needs to search for the position of the charging stand, thereby taking a long time to search for the charging stand.

DISCLOSURE

Technical Problem

An object of the present invention is to provide a robot cleaner and a control method thereof, which reduce a time for returning to a charging stand.

In addition, another object of the present invention is to provide a robot cleaner and a control method thereof which reduce a time to return to the charging stand to increase a probability of returning to the charging stand.

In addition, still another object of the present invention is to provide a robot cleaner and a control method thereof, which reduce a time required for returning to a charging stand to prevent the robot cleaner from being stopped before returning to the charging stand due to battery discharge or interference with obstacles in a return process.

Technical Solution

According to an aspect, a robot cleaner may include a body provided with a driving unit for movement, a position recognition unit provided in the body to recognize a position of the body, a storage unit configured to store, on a map, a region cleaned while the body is moving by the driving unit, and a control unit configured to control the driving unit.

The control unit may determine whether a charging stand exists in a cleaning completed region on the map stored in the storage unit when a return condition that the body returns to the charging stand is satisfied, The control unit may searches for an uncleaned region when the charging stand is not located in the cleaning completed region, and controls the driving unit such that the body moves from a current position to a point in a found uncleaned region or a point around the found uncleaned region.

The one point in the uncleaned region may be a point on a boundary between the uncleaned region and the cleaning completed region.

The control unit may divide a cleaning target region into a plurality of small regions, and control the driving unit such that the body performs cleansing on each of the small regions, and the uncleaned region may be a small region in which cleaning is not completed among the plurality of small regions.

The control unit may allow the driving unit to perform wall-following in the uncleaned region and search for the charging stand.

When there are a plurality of uncleaned regions among the plurality of small regions, the control unit may allow the driving unit to search for the charging stand while moving to the plurality of uncleaned regions sequentially.

The one point around the uncleaned region is a moving target region including a region connected to the uncleaned region. The moving target region may be a region in which cleaning is completed.

The control unit may set a plurality of target coordinates in the moving target region and determine a target coordinate adjacent to a region connected to the uncleaned region among the plurality of target coordinates.

The control unit ma set a plurality of target coordinates in the moving target region, and divide the moving target region into a plurality of small regions by drawing diagonal lines connecting the plurality of target coordinates. The control unit may select a small region including a region connected to the uncleaned region among the plurality of small regions and control the driving unit such that the robot cleaner moves to one target coordinate among two target coordinates included in the small region.

When there are a plurality of regions connected to the uncleaned region, the control unit may select a small region having the largest area among the regions connected to the uncleaned region, and controls the driving unit such that the robot cleaner moves to one of the two target coordinates included in the selected small region.

The plurality of target coordinates may be vertex coordinates of the moving target region.

When an obstacle exists at the vertex coordinates, the control unit may determine a changed position for avoiding the obstacle as the target coordinates.

The control unit may control the driving unit such that the body performs wall-following to search for the charging stand after the body moves to the determined one point.

When the body enters a cleaning completed region in process of performing the wall-following, the control unit may re-searches for an uncleaned region on the map, and control the driving unit such that the body moves to one point in a re-found uncleaned region or one point around the re-found uncleaned region.

According to another aspect, a control method of a robot cleaner may include performing, by the robot cleaner, cleaning while navigating, determining whether a return condition that the robot cleaner returns to a charging stand is satisfied, determining whether the charging stand exists in a cleaning completed region on a map stored in a storage unit when a return condition is satisfied, searching for an uncleaned region on the map stored in the storage unit when the charging stand does not exist in the cleaning completed, and controlling the robot cleaner such that the body moves from a current position to a point in the found uncleaned region or a point around the found uncleaned region.

The control method may further include performing, by the robot cleaner, wall-following after the robot cleaner moves to the one point.

The control method may further include, when the robot cleaner enters a cleaning completed region in process of performing the wall-following, re-searching for an uncleaned region on the map, and moving, by the robot cleaner, to one point of a re-found uncleaned region or one point around the re-found uncleaned region.

The performing cleaning may include dividing, by the robot cleaner, a cleaning target region into a plurality of small regions and performing cleaning on each of the small regions, and the uncleaned region may be a small region in which cleaning is not completed among the plurality of small regions.

The one point in the uncleaned region may be a point on a boundary between the uncleaned region and the cleaning completed region.

Advantageous Effects

According to the present invention, when a condition for returning to the charging stand is satisfied, the robot cleaner searches for the cleaning completion region and the uncleaned region on the map stored in the storage unit, and when the charging stand does not exist in the cleaning completed region, searches for the charging stand while traveling through the uncleaned region, thereby reducing a travel distance for searching for the charging stand and therefore, reducing the time for returning to the charging stand.

Also, when the time to return to the charging stand is reduced, a probability of the battery being completely discharged in the process for searching for the charging stand is reduced, thereby increasing the probability of returning to the charging stand.

Further, a movement distance for returning to the charging stand is reduced, and therefore, the robot cleaner may be prevented from being stopped before returning to the charging stand due to the interference with the obstacle during in the process of searching for the charging stand.

In addition, since the uncleaned region is connected to the cleaning completed region and map information for the cleaning completed region is already stored, the robot cleaner may move in the shortest distance in consideration of obstacle information in the cleaning completed region when moving to the uncleaned region or one point around the uncleaned region, thereby reducing a time taken to move to the uncleaned region.

MODE FOR INVENTION

Figure 1:
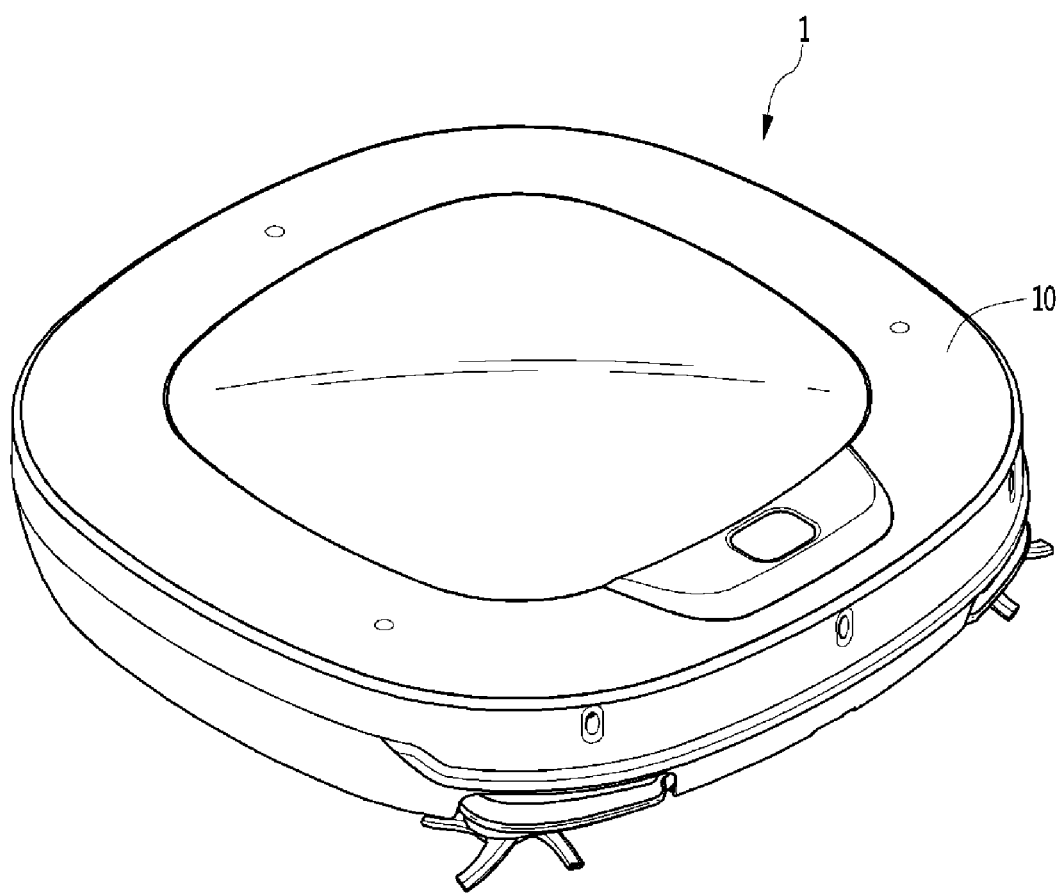
FIG. 1 is a perspective view of a robot cleaner according to an embodiment of the present invention.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
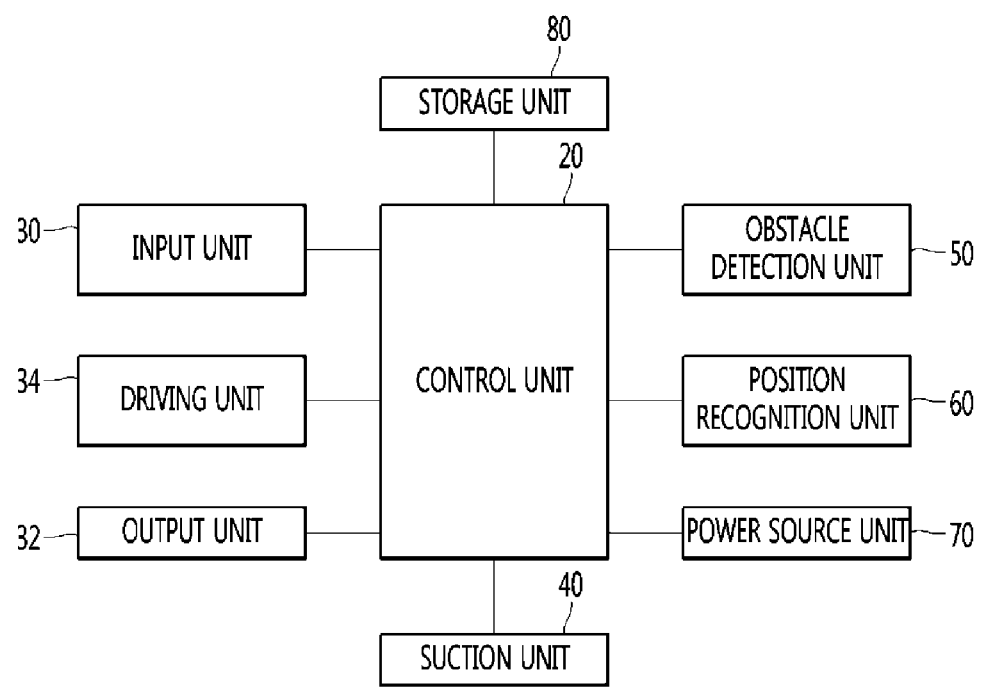
FIG. 2 is a block diagram of a robot cleaner according to an embodiment of the present invention.

FIG. 1 is a perspective view of a robot cleaner according to an embodiment of the present invention, and FIG. 2 is a block diagram of a robot cleaner according to an embodiment of the present invention.

Referring to FIGS. 1 and 2, a robot cleaner 1 according to an embodiment of the present invention may include a body 10 forming an appearance.

A suction unit 40 that generates a suction force and a dust box (not shown) that stores dust separated from sucked air may be provided inside the body 10.

The robot cleaner 1 may further include an input unit 30 capable of receiving a control command from the outside or receiving a command for outputting one or more pieces of information.

The input unit 30 may include one or more input buttons. The input button may be provided on an upper surface of the body 10 so as to allow the user to easily press the input button. The user may input a command for controlling the robot cleaner 1 through the input button.

As an example, it is possible to input, through the input button, an identification command for identifying a cleaning region, a cleaning map, obstacle information, and the like, a setting command for setting a traveling method and the like, a cleaning start command, a cleaning end command, a return command for returning to a charging stand, or the like.

Alternatively, it is possible to input a control command of the robot cleaner 1 by using a separate terminal connected to the robot cleaner 1 in a wireless manner or in a wired manner. In this case, the robot cleaner 1 may further include a communication unit (not shown) for receiving a control command input from the terminal.

The robot cleaner 1 may further include an output unit 32 for displaying status information or displaying output information in response to a command input to the input unit 30.

The output unit 32 may be formed of any one of a light emitting diode (LED), a liquid crystal display (LCD), a plasma display panel, and an organic light emitting diode (OLED) and may output text, an image, or the like. In addition, the output unit 32 may include means for outputting sound, such as a beeper, a speaker, or the like.

The robot cleaner 1 may further include a driving unit 34 for moving the body 10.

The driving unit 34 may include one or more wheels and one or more motors for driving the wheels. For stable movement of the robot cleaner 1, the driving unit 34 may include a plurality of wheels and a plurality of motors for respectively driving the plurality of wheels.

Therefore, the robot cleaner 1 may be advanced or retracted by the driving unit 34, and may be turned to the left or right. The driving unit 34 may be provided at a lower portion of the body 10, for example.

The robot cleaner 1 may further include an obstacle detection unit 50.

The obstacle detection unit 50 may detect an obstacle around the robot cleaner 1 while the robot cleaner 1 is moving in the cleaning target region or performing cleaning. The obstacle detection unit 50 may transmit obstacle information such as the presence or absence, position, size, or the like of the detected obstacle to the control unit 20.

The obstacle detection unit 50 may be provided, for example, on a front surface of the body 10 to easily detect obstacles located in front of the robot cleaner 1 in a traveling direction of the robot cleaner 1. Alternatively, the obstacle detection unit 50 may be provided on the front surface and both side surfaces of the body 10. It should be noted that there is no limitation in the position of the obstacle detection unit 50 in the present invention.

The obstacle detection unit 50 may be implemented with a distance sensor for transmitting a signal and detecting a position of an obstacle and a distance from an obstacle through a received signal, such as a supersonic sensor, an infrared sensor, and an RF sensor, or a collision sensor for detecting an obstacle by collision with the obstacle, or the like.

The robot cleaner 1 may further include a position recognition unit 60 that recognizes a current position of the robot cleaner 1 in a cleaning target region.

The position recognition unit 60 may use a sensor, such as an acceleration sensor, an encoder, a gyro sensor, or a laser sensor, for example. The acceleration sensor may recognize a speed and a position of the robot cleaner according to the movement of the robot cleaner. The encoder may be connected to a motor for driving the wheels of the robot cleaner to detect the speed. The gyro sensor may detect a rotational speed of the robot cleaner. Alternatively, the position recognition unit 60 may use a camera that photographs a forward or upward image and determines an absolute position of the robot cleaner.

Further, in the present invention, the robot cleaner 1 may recognize a return signal (for example, an infrared signal) output from the charging stand by using the position recognition unit 60. Alternatively, the robot cleaner 1 may further include a return sensor for receiving the return signal.

The robot cleaner 1 may further include a power source unit 70 having chargeable power supply means to supply power to the body 10. The power source unit 70 may supply operation power necessary for the robot cleaner 1 to move and perform cleaning and when the remaining capacity of a battery is insufficient, turn to the charging stand and receive the charge current from the charging stand to charge the battery.

The robot cleaner 1 may further include a storage unit 80 that stores various information such as status information, position information, cleaning mode, and obstacle information.

The storage unit 80 may store predetermined map information or map information generated in a cleaning process. The control unit 20 may identify the current position of the robot cleaner 1 on the map and identify a cleaning completed region and an uncleaned region based on a travel path of the robot cleaner 1.

Also, the control unit 20 may store information on a obstacle existing in the cleaning completed region on the map. In this case, the storage unit 80 may store the obstacle information classified according to types of obstacles.

Hereinafter, a control method of the robot cleaner of the present invention will be described.

Figure 3:
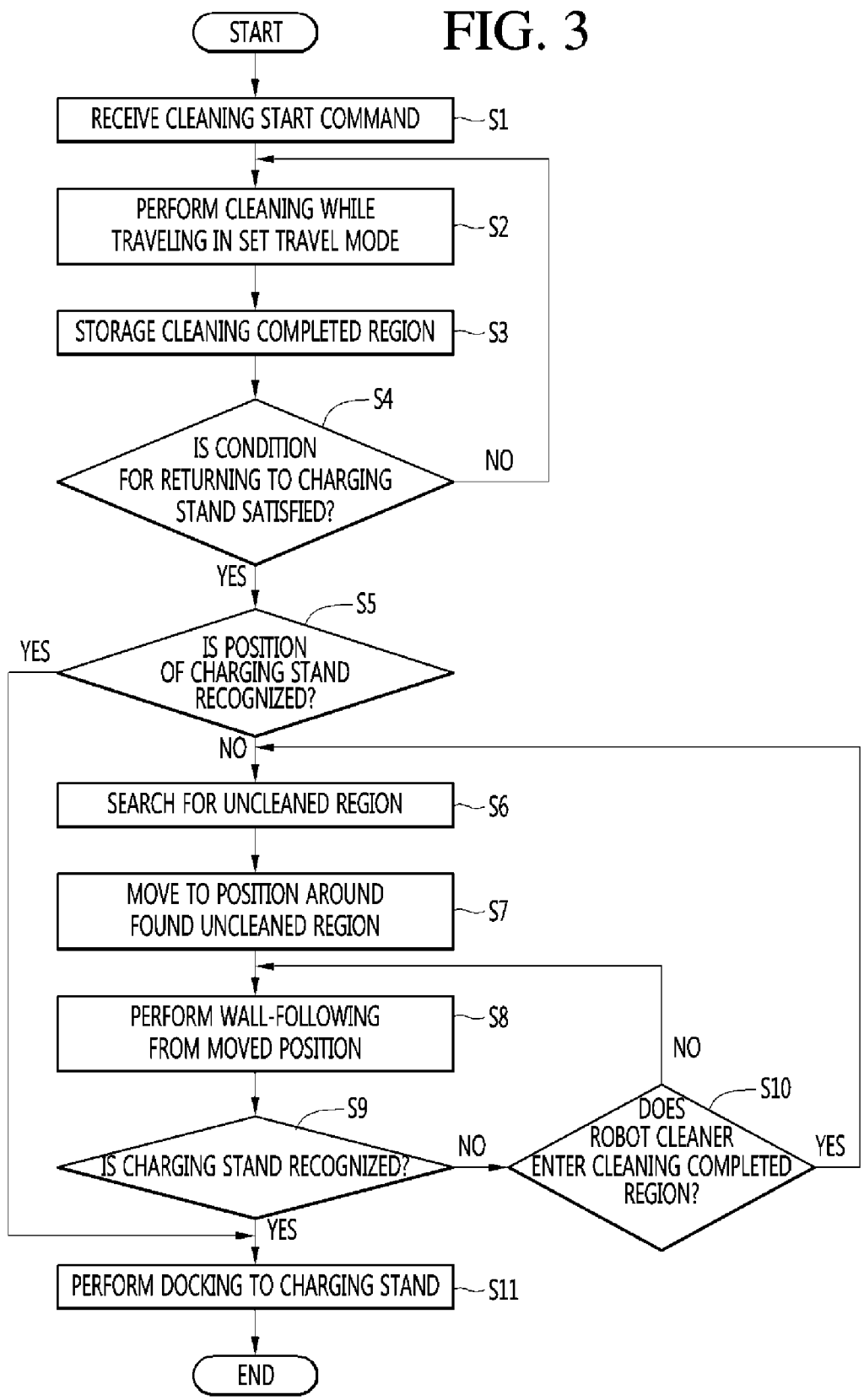
FIG. 3 is a diagram for describing a control method of a robot cleaner of the present invention.

FIG. 3 is a diagram for describing a control method of the robot cleaner of the present invention.

Referring to FIG. 3, when the robot cleaner 1 receives a cleaning start command (S1), the robot cleaner performs cleaning while traveling in a set travel mode (S2).

The cleaning start command of the robot cleaner 1 may be inputted through the input unit 32 or received from a user's terminal.

The set travel mode may be selected from various travel modes such as a random mode, a zigzag travel mode, and a spiral mode (spiral travel mode), and the user may select the travel mode.

The robot cleaner 1 may perform cleaning while traveling on a cleaning target region and store a cleaning completed region (S3). That is, the robot cleaner 1 may generate a map while updating cleaning completed regions, or updates the map.

In the course of performing the cleaning in the robot cleaner 1, the control unit 20 may determine whether or not a condition for returning to the charging stand is satisfied (S4).

In the present invention, when the condition for returning to the charging stand is satisfied, it is determined that a cleaning end command is input through the input unit 32, the cleaning is completed, or the remaining capacity of the battery reaches a reference remaining capacity, or when the user inputs a return command.

When it is determined in step S4 that the condition for returning to the charging stand is satisfied, the control unit 20 may determine whether a current position of the charging stand is recognized (S5). That is, the control unit 20 may determine whether or not the charging stand exists in the cleaning completed region.

The robot cleaner 1 not only displays the obstacle information on the map during the cleaning process as described above, but also stores a position of the charging stand on the map when the charging stand exists. A case where the robot cleaner 1 recognizes that a charging stand exists in the cleaning process may correspond to a case where the robot cleaner 1 recognizes a signal generated in the charging stand during the cleaning process.

When the charging stand is recognized during the cleaning process, the position of the charging stand is stored on the map such that the robot cleaner 1 is able to quickly move to the charging stand located in the cleaning completed region.

When it is determined in step S5 that the position of the charging stand is recognized, the control unit 20 may control the driving unit 34 such that the robot cleaner 1 moves to a position where the charging stand exists to perform docking to the charging stand (S11). A method for docking to the charging stand in the robot cleaner 1 may be implemented by a known technique, and thus a detailed description thereof will be omitted.

On the other hand, when it is determined in step S5 that the position of the charging stand is not recognized, the control unit 20 may search for a uncleaned region on the map stored in the storage unit 80 (S6). A method of searching for an uncleaned region on a map in the present invention will be described later with reference to the drawings.

The control unit 20 may search for an uncleaned region on the map and then determine one point in the found uncleaned region or one point around the found uncleaned region. Then, the control unit 20 controls the driving unit 34 such that the robot cleaner 1 moves from a current position to one point in the found uncleaned region or to one point around the found uncleaned region (S7).

After the robot cleaner 1 moves to the one point, the robot cleaner 1 may search for the charging stand while performing wall-following from the moved point (S8).

As an example, the robot cleaner 1 may search for a charging stand while moving along a wall located on the right side of the robot cleaner 1, but the present invention is not limited thereto. The robot cleaner 1 may move along a wall located on the left side of the robot cleaner 1.

That is, in the present invention, in order to return to the charging stand, the robot cleaner may perform a start position moving process of moving to a position at which wall-following is to be started, a charging stand searching process of performing wall-following and a docking process of docking to the charging stand after searching for the charging stand.

When the charging stand is recognized in the wall-following process (S9), the robot cleaner 1 may perform docking to the charging stand (S11).

On the other hand, when the robot cleaner 1 enters a cleaning completed region before recognizing the charging stand during the wall-following process, the control unit 20 may control the driving unit 34 such that the robot cleaner 1 gets out of the cleaning completed region and moves to an uncleaned region (returning to step S6).

In this case, when the robot cleaner 1 enters the cleaning completed region, the control unit 20 may search for a new uncleaned region by reflecting the travel path along which the robot cleaner 1 has passed up to a current time point in the wall-following process.

That is, it is possible to re-search for an uncleaned region except for regions through which the robot cleaner 1 has passed during the wall-following process in a previously-found uncleaned region. After moving to one point within the re-founded uncleaned region or one point around the re-founded uncleaned region, the wall-following may be performed again.

Hereinafter, a method of searching for an uncleaned region will be described.

Figure 4:
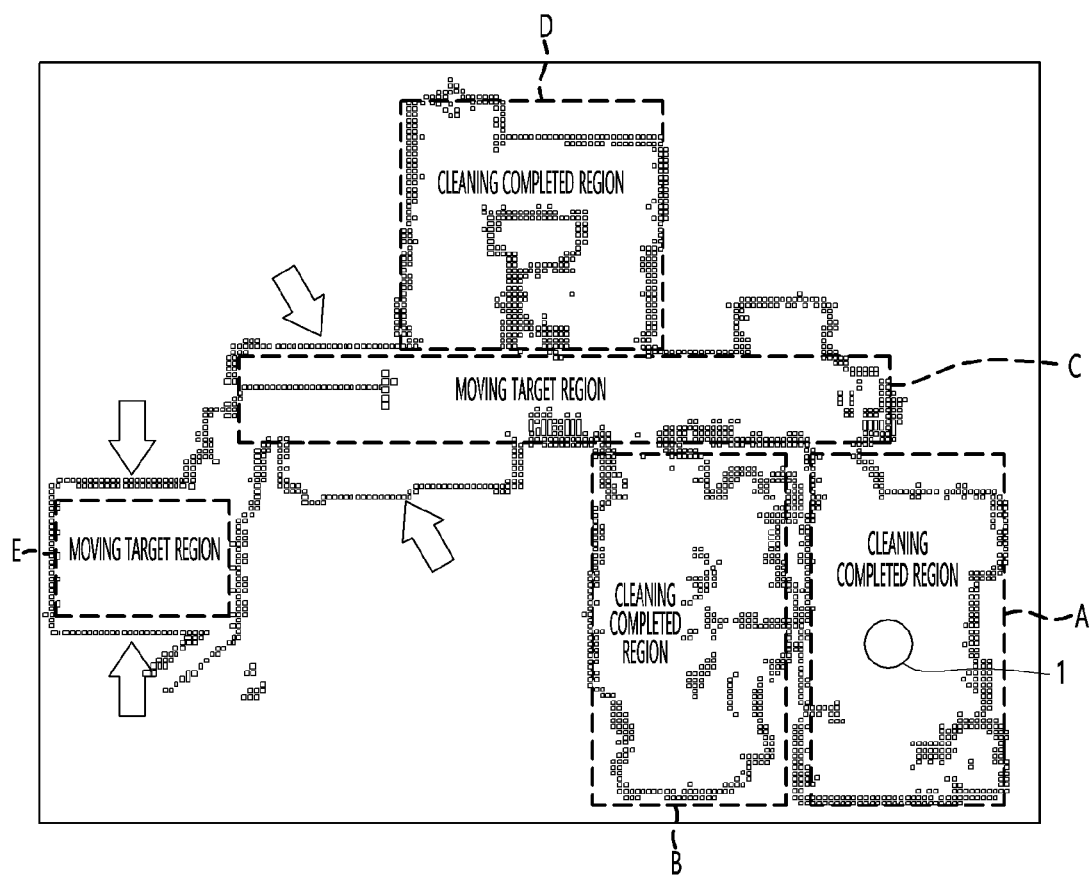
FIG. 4 shows a first method for searching for an uncleaned region in a cleaning target region.
Figure 5:
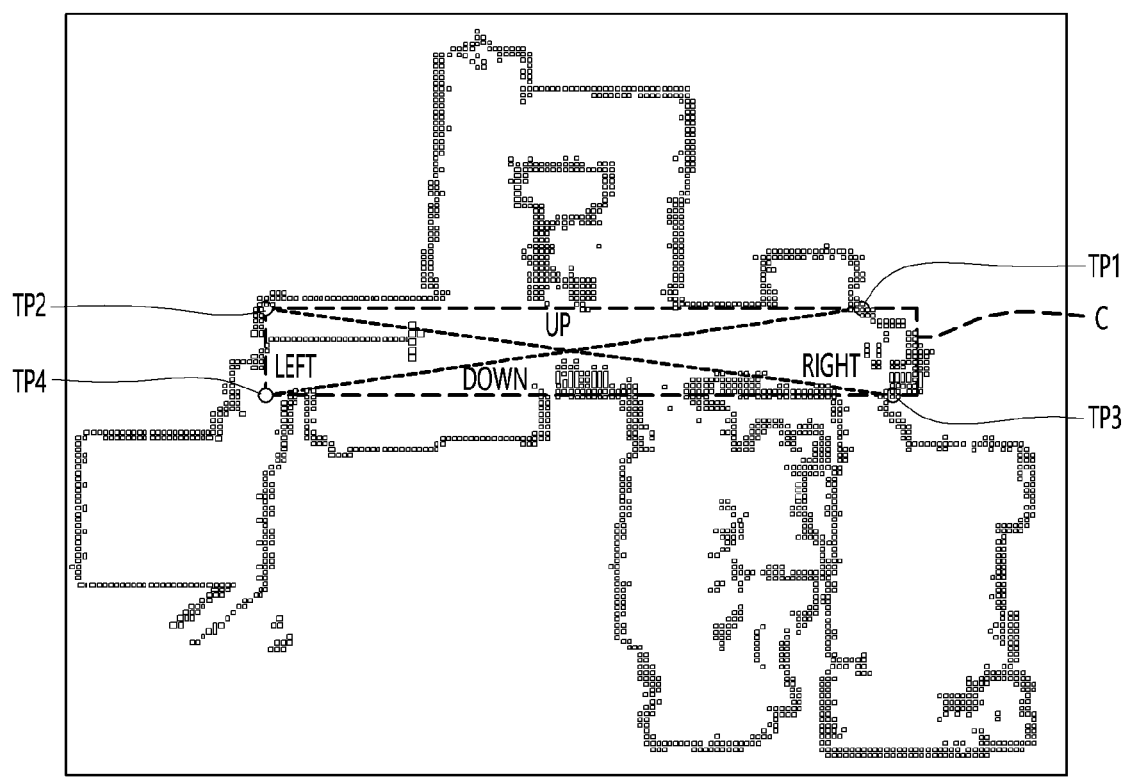
FIG. 5 is a diagram showing a method for searching for a target coordinate around an uncleaned region.
Figure 6:
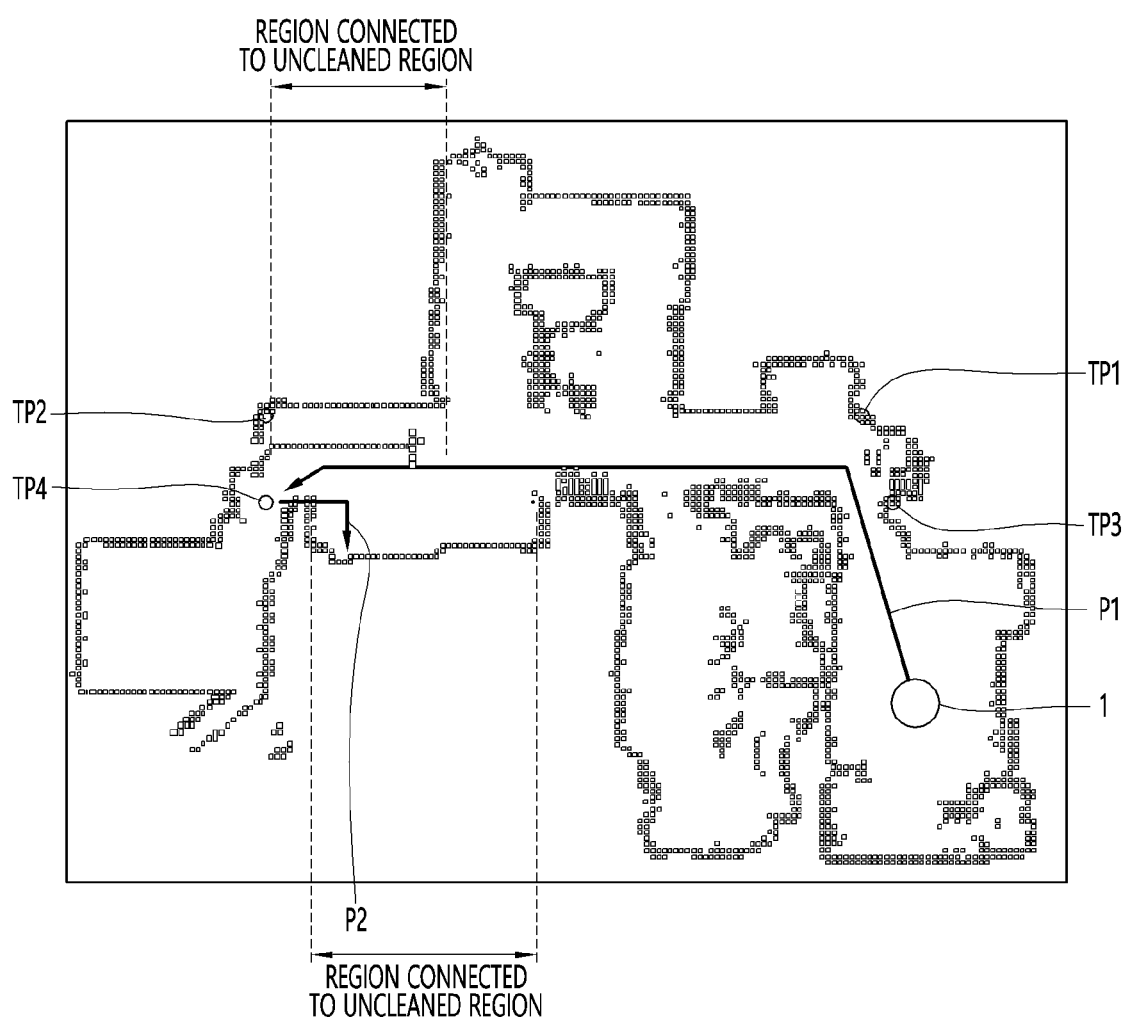
FIG. 6 is a diagram showing a state in which a robot cleaner according to the present invention starts wall-following after moving to a determined target position from a current position.
Figure 7:
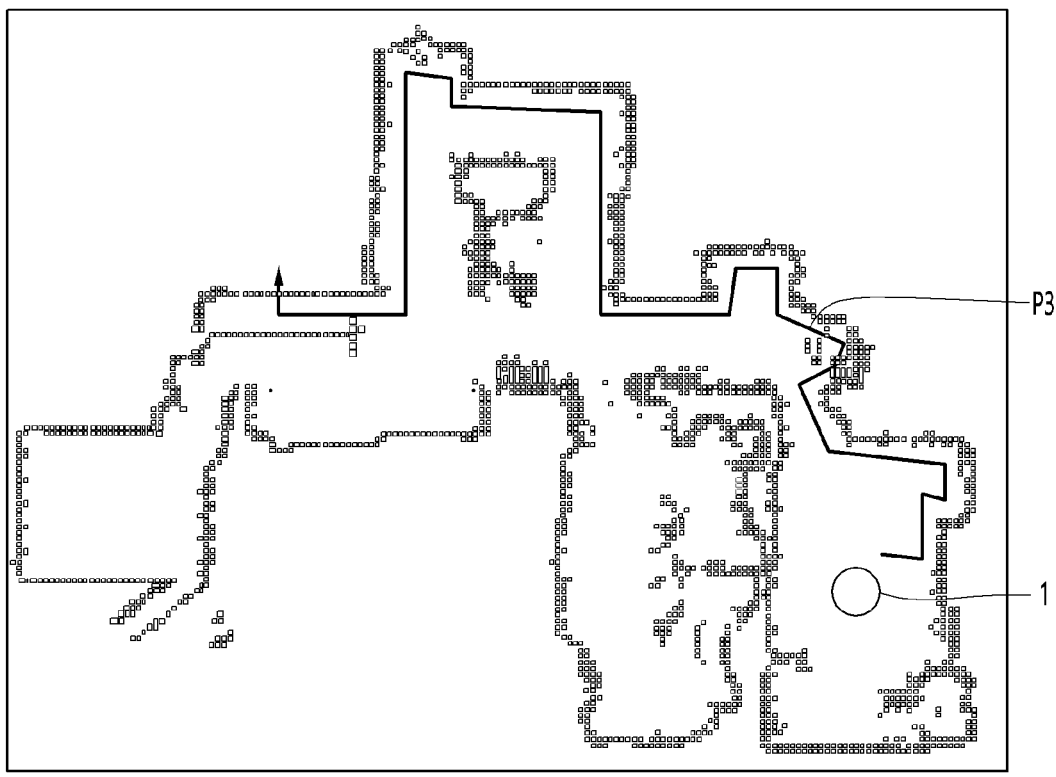
FIG. 7 is a diagram showing a state in which a robot cleaner according to the related art starts wall-following from its current position.

FIG. 4 shows a first method for searching for an uncleaned region in a cleaning target region, FIG. 5 is a diagram showing a method for searching for a target coordinate around an uncleaned region, FIG. 6 is a diagram showing a state in which a robot cleaner according to the present invention starts wall-following after moving to a determined target position from a current position, and FIG. 7 is a diagram showing a state in which a robot cleaner according to the related art starts wall-following from its current position.

Referring to FIG. 4, when a condition for returning to a charging stand is satisfied in a cleaning performance process, the control unit 20 may search for an uncleaned region based on information on the map generated in a cleaning process.

A method for searching for an uncleaned region may include dividing a map into a plurality of division regions, determining a moving target region connected to an uncleaned region among the division regions, generating a plurality of target coordinates in the moving target region and determining a final coordinate to which the robot cleaner is to move among the generated coordinates.

Specifically, since obstacle information is stored on the map in the process of performing, by the robot cleaner, cleaning, the regions on the map may be distinguished by walls or other obstacles.

The control unit 20 may perform image processing on the map stored in the storage unit 80 and divide the map into a plurality of division regions.

As an example, a region on the map may be divided into regions A to E as shown in FIG. 4. In this case, the region A is a cleaning completed region, and the region A is surrounded by obstacles except boundary portions with the region C.

In this way, the control unit 20 may determine a region such as the region A in which a closed curve is completely formed by being surrounded by obstacles including a movement path between the regions, as a cleaning completed region. That is, since the obstacle information may be known when the cleaning has already been completed, when the closed curve including the movement path between the obstacle and the regions is formed, it is determined that the corresponding region corresponds to an already-cleaned region.

Therefore, in FIG. 4, the regions A, B, and D correspond to cleaning completed regions. Further, it is assumed that the robot cleaner is located within region A.

On the other hand, the region C and the region E are partially surrounded by the obstacles, but are partially open (the portion indicated by the arrow is an opened portion). The region C and the region E are at least partially cleaned but are connected to an uncleaned region, so that a closed curve is not formed.

Therefore, the control unit 20 determines the region C and the region E, which are regions where the closed curve is not formed, as moving target regions. That is, the moving target region determined in the present invention is also connected to the uncleaned region, although it is actually a cleaning completed region. Therefore, the moving target region is a peripheral region of the uncleaned region.

The control unit 20 may determine any one of the plurality of moving target regions as a moving target region having the highest priority when a plurality of moving target regions are determined. As an example, an opened region in the determined moving target region, that is, a region having the largest area among regions connected to the uncleaned region may finally be determined as the moving target region.

Alternatively, the control unit 20 may determine the moving target region closest to the current position among the plurality of moving target regions.

In FIG. 4, since the region C has a large area connected to the uncleaned region, the region C may be determined as the moving target region.

Next, the control unit 20 may determine a plurality of target coordinates TP1, TP2, TP3, and TP4 which the robot cleaner is to move on the determined moving target region as shown in FIG. 5. As an example, when the moving target region is formed in a rectangular shape or the like, the control unit 20 may determine the coordinates corresponding to the vertex of the moving target region as the target coordinates.

In this case, when an obstacle exists in the target coordinates, the changed coordinates avoiding the obstacle may be determined as the target coordinates.

The control unit 20 may determine a final coordinate to be finally moved among the determined plurality of target coordinates.

As an example, the target coordinates adjacent to the uncleaned region may be selected among the plurality of target coordinates.

Alternatively, as shown in FIG. 5, the moving target region may be divided into four small regions by connecting the four target coordinates by a diagonal line. Then, a small region in which a portion connected to the uncleaned region exists is determined in the moving target region.

When the moving target region includes a plurality of regions connected to the uncleaned region, a region having the largest area connected to the uncleaned region among the four small regions may be determined. In FIG. 5, since the region having the largest area connected to the undamaged region is a lower region DOWN, the lower region may be selected.

Then one of the coordinates TP4 and TP3 included in the selected lower region may be selected as the final coordinate based on the wall-following direction of the robot cleaner. In the present embodiment, for example, when the robot cleaner 1 is controlled so as to move along the right wall, TP4 may be selected as the final coordinate, i.e., a starting coordinate for the wall-following.

When TP4 is determined as the final coordinate as described above, the control unit 20 may control the driving unit 34 such that the robot cleaner 1 moves to the final coordinate TP4 within the moving target region from the current position (within the region A).

As shown in FIG. 6, when the robot cleaner 1 moves to the final coordinate (path P1), the control unit 20 may control the driving unit 34 such that the robot cleaner 1 performs the wall-following operation (path P2).

Since the moving target region is a cleaning completed region and the obstacle information is known in advance, the control unit 20 may control the driving unit 34 such that the robot cleaner 1 avoids obstacles and moves to the final coordinate in the shortest path.

In the case of the robot cleaner to which the control method of the present invention is not applied, the robot cleaner performs wall-following from the current position to start searching for a charging stand as shown in FIG. 7. Then, the robot cleaner may starts wall-following in the cleaning completed region in which cleaning is already finished.

As shown in FIG. 7, when the robot cleaner travels (path P3), the robot cleaner needs to travel even in the cleaning completed region, thereby causing a problem that it takes a lot of time for the robot cleaner to find the charging stand. Further, when the battery is insufficient, there is a problem that the robot cleaner is stopped before finding the charging stand.

That is, since the robot cleaner needs to move an unnecessary region (cleaning completed region) in which the robot cleaner does not need to move to search for the charging stand, it takes a long time to search for the charging stand.

It is not necessary to search for the charging stand in the cleaning completed region unless the charging stand is present in cleaning completed region.

Therefore, according to the present invention, the robot cleaner searches for an uncleaned region on the map to exclude the cleaning completed region, moves around one point around the uncleaned region, and then searches for the charging stand, thereby providing an advantage in that a time required for searching for the charging stand is reduced because the robot cleaner does not unnecessarily travel the cleaning completed region.

Further, the time required to search for the charging stand is reduced, that is, the traveling path required to search for the charging stand is reduced, thereby reducing a phenomenon that the robot cleaner is inadvertently stopped due to the discharge of the battery or the interference of the obstacle in the process of searching the charging stand in the robot cleaner.

As the traveling path for searching for the charging stand is reduced, a probability that the robot cleaner returns to the charging stand is increased.

Figure 10:
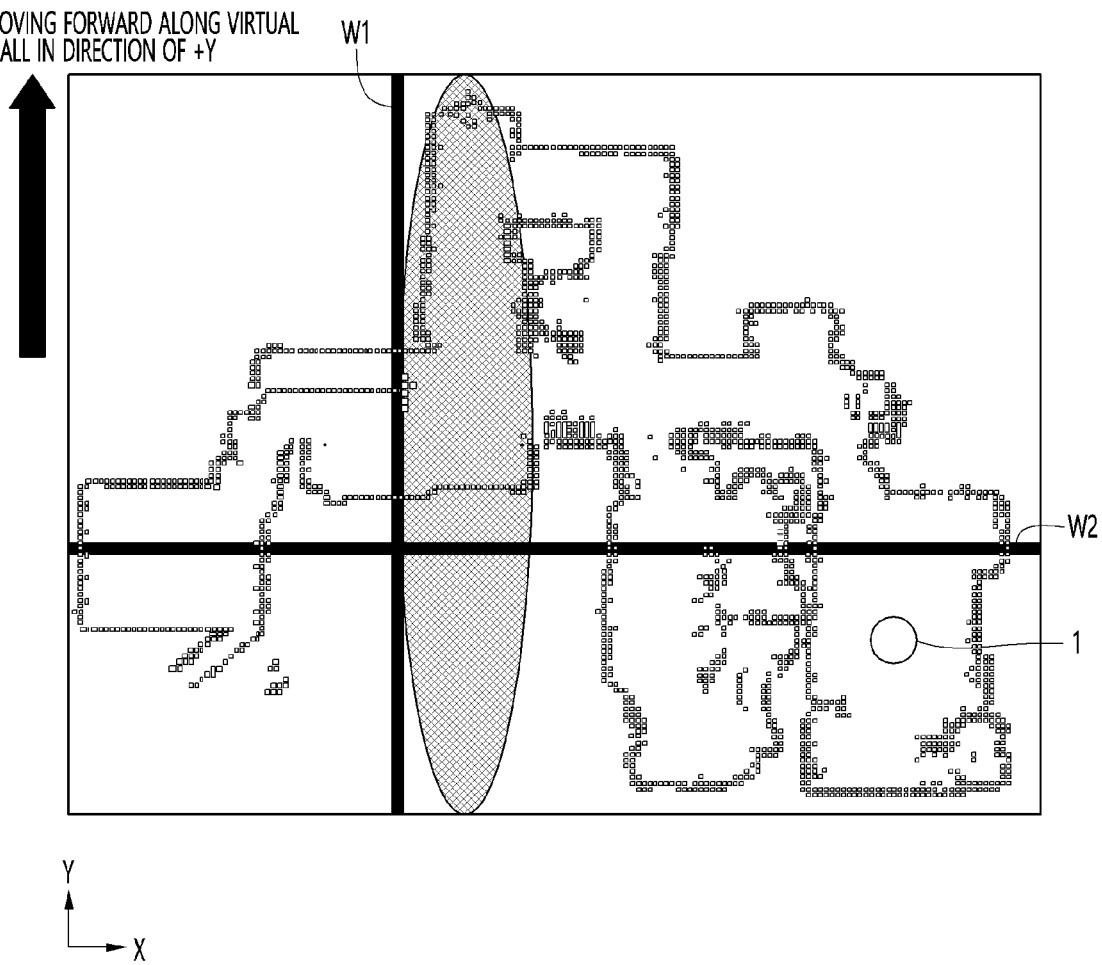
Figure 11:
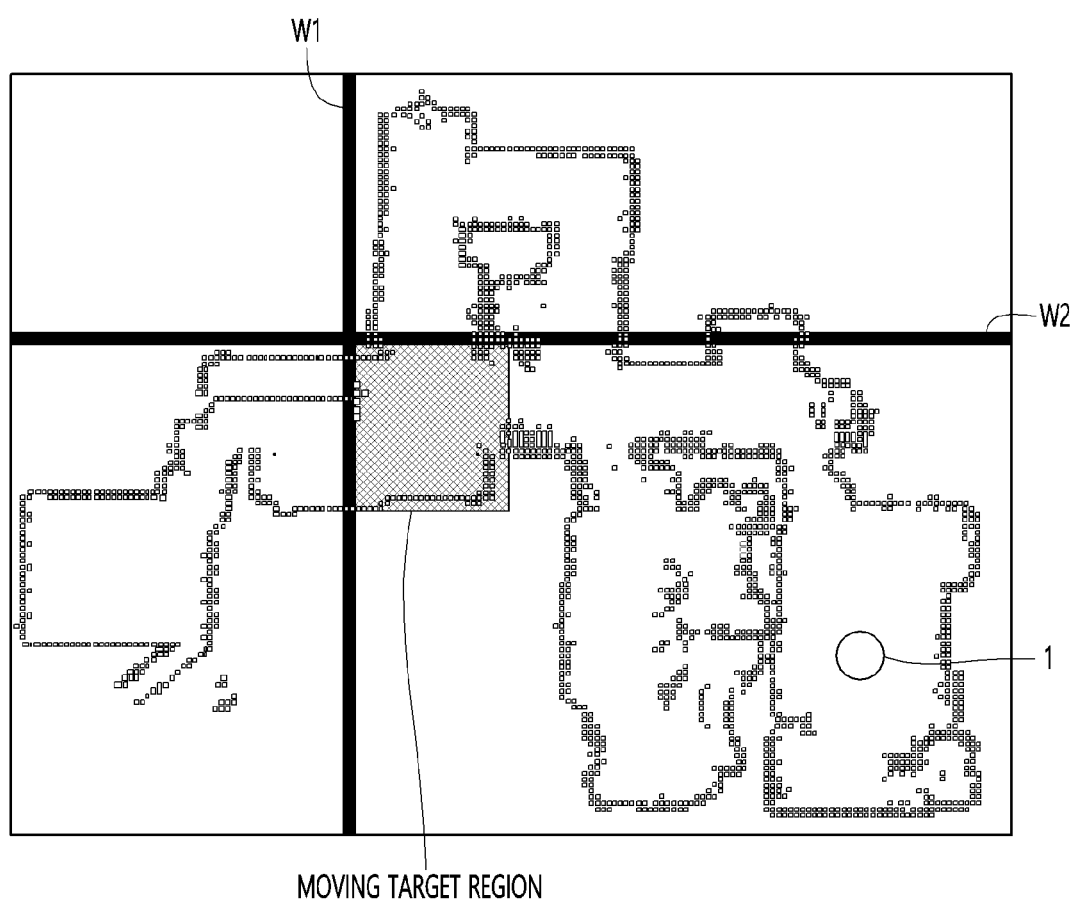
Figure 12:
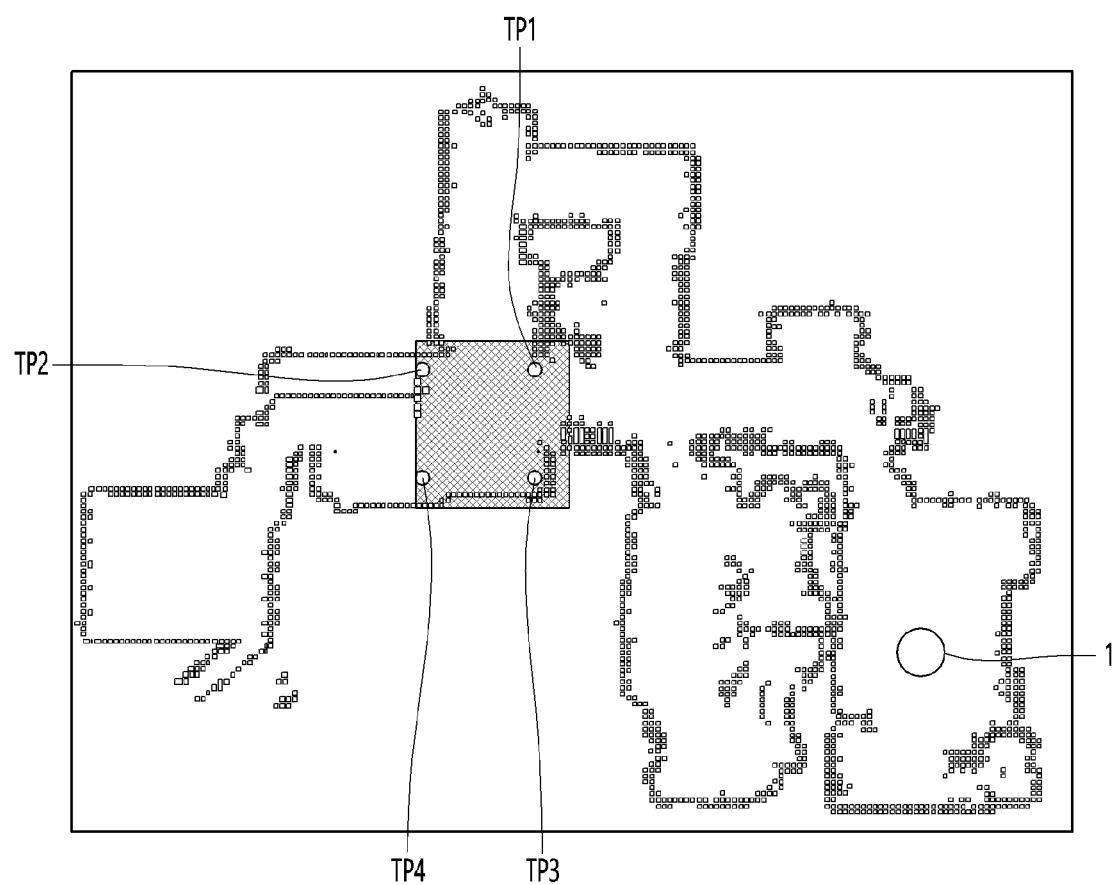
FIG. 12 is a diagram showing a method for searching for a target coordinate around a uncleaned region.
Figure 13:
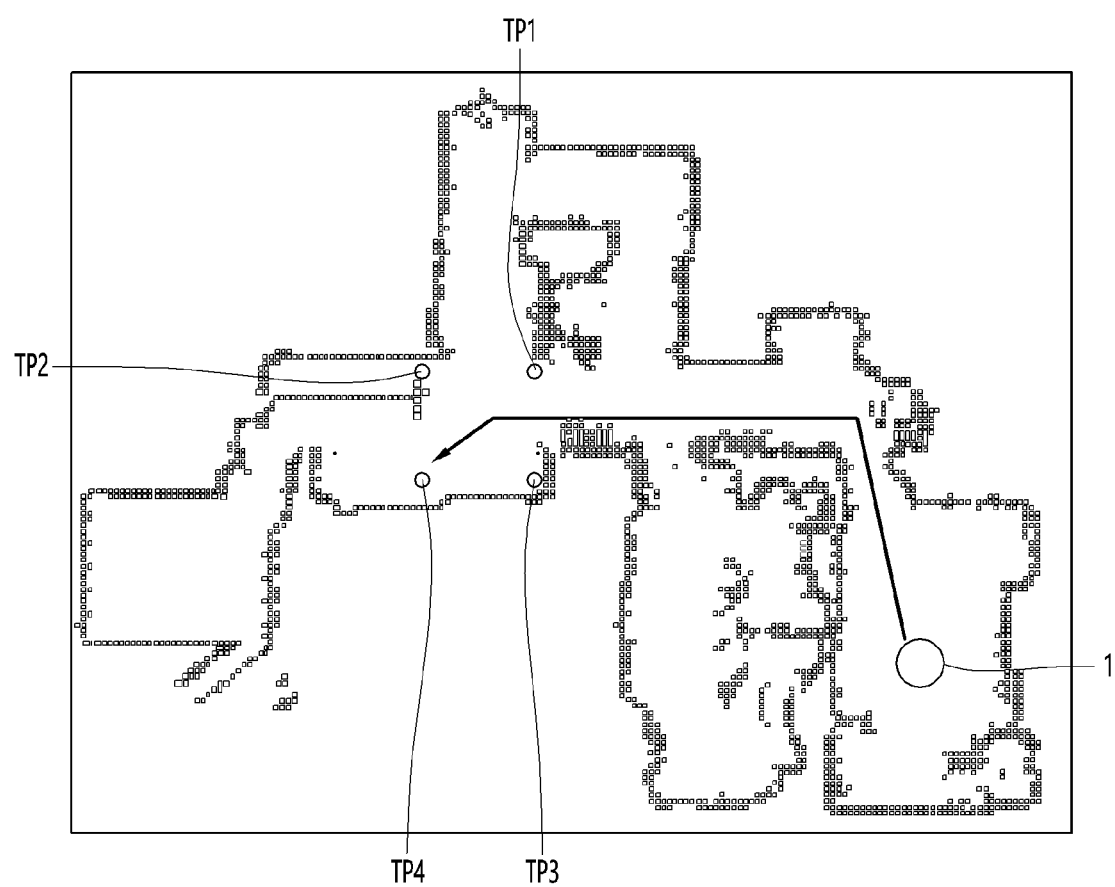
FIG. 13 is a diagram showing a state in which a robot cleaner according to the present invention moves from a current position to a determined target position.

FIGS. 8 to 11 diagrams showing a second method for searching for a uncleaned region in a cleaning target region, FIG. 12 is a diagram showing a method for searching for a target coordinate around a uncleaned region, and FIG. 13 is a diagram showing a state in which a robot cleaner according to the present invention moves from a current position to a determined target position.

First, referring to FIGS. 8 to 11, the control unit 20 may determine the horizontal direction of the map as an X-axis and the vertical direction as a Y-axis in order to determine a moving target region on the map stored in the storage unit 80.

A virtual first wall W1 perpendicular to the X axis is drawn at an arbitrary point on the map or at a point farthest from a point where the robot cleaner is currently located. Then, the virtual first wall W1 is moved in the X-axis direction (the right direction in the drawing). In this case, the right direction is a direction approaching the robot cleaner 1.

The control unit 20 determines whether or not a region including the current position of the robot cleaner 1 in the process of moving the first wall W1 forms a closed curve surrounded by a obstacle and the first wall W1.

Figure 8:
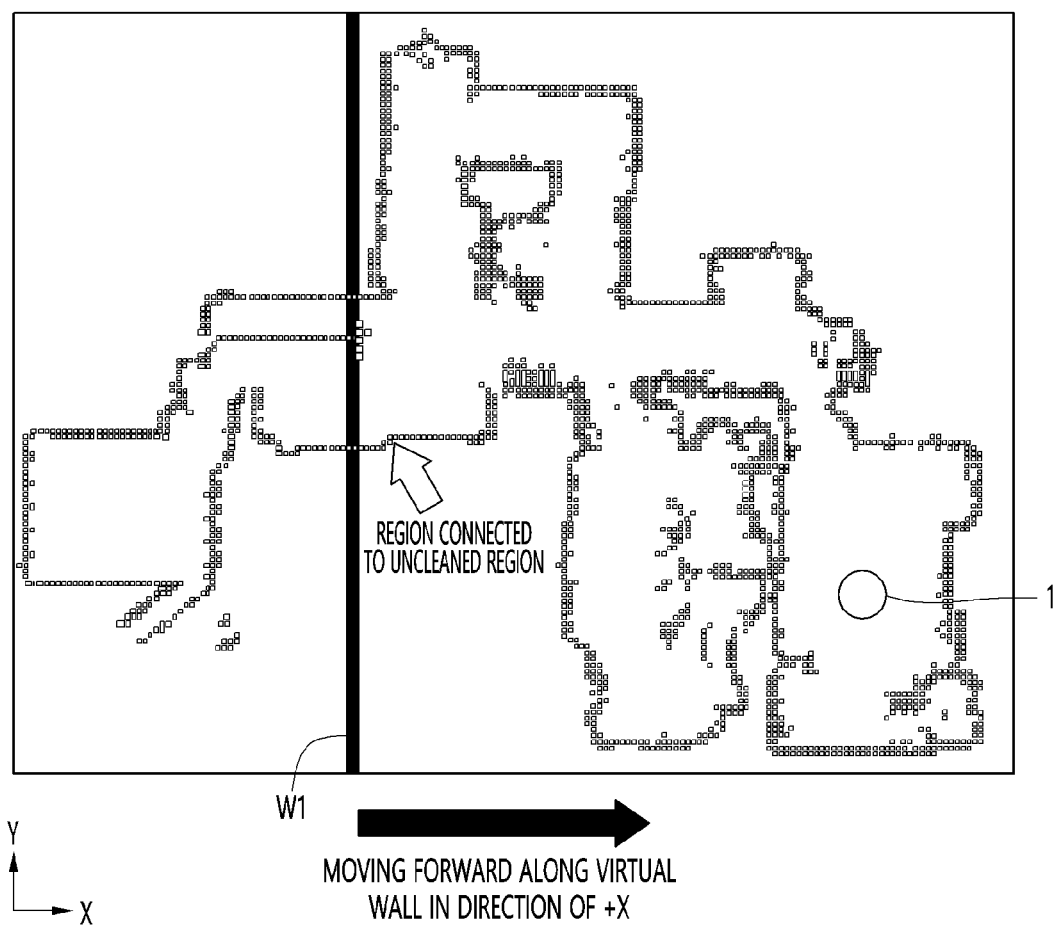
FIGS. 8 to 11 diagrams showing a second method for searching for a uncleaned region in a cleaning target region.

When the first wall W1 is located as shown in FIG. 8, the region including the current position of the robot cleaner 1 includes the region connected to an uncleaned region. Therefore, the region (first identified region) including the current position of the robot cleaner 1 does not form a closed curve.

Figure 9:
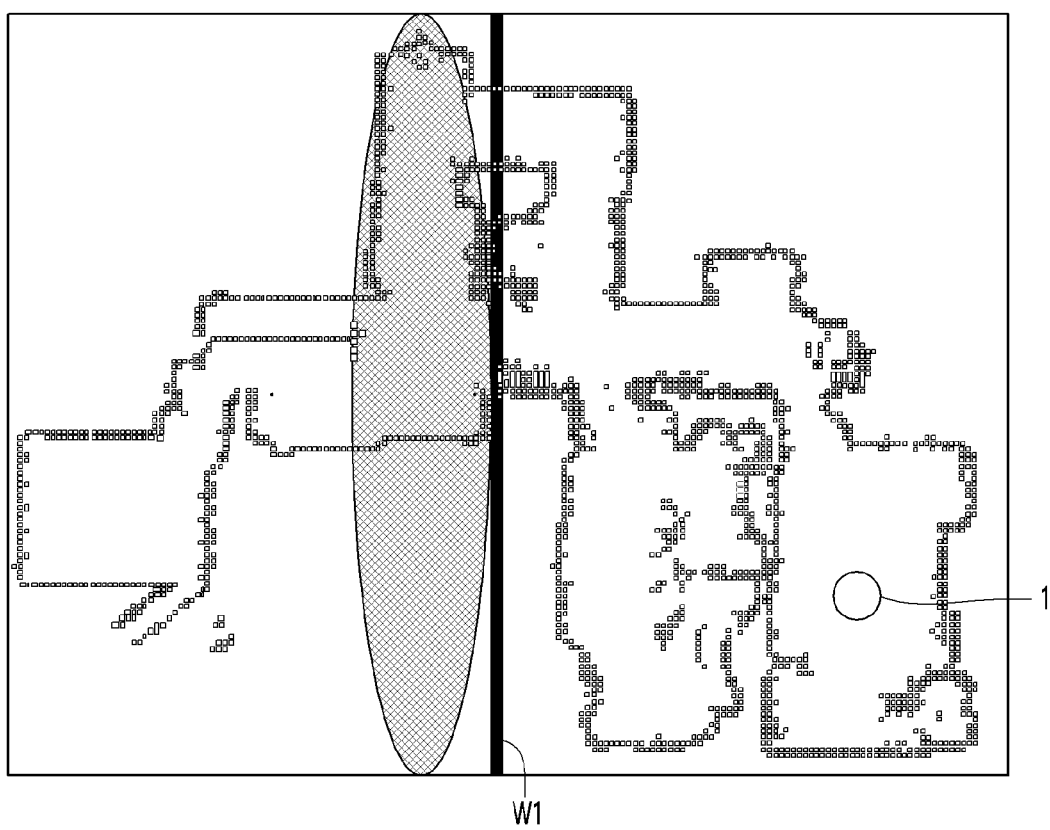

When the first wall W1 is located as shown in FIG. 9, a region including the current position of the robot cleaner 1 (second identified region) forms a closed curve. In this case, there is a region connected to the uncleaned region is located between the first wall W1 serving as a boundary of the first identified region and the first wall W1 serving as a boundary between the second identified (a region indicated by the arrow in FIG. 8).

Accordingly, a region between the first wall W1 serving as the boundary of the first identified region and the first wall W1 serving as the boundary of the second identified region is extracted as a temporary region.

Then, the control unit 20 draws a virtual second wall W2 perpendicular to the Y axis as shown in FIG. 10, for example, at an arbitrary point on the map or at a point where the robot cleaner is currently located. Then, the virtual second wall W2 is moved in the Y-axis direction (the upward direction in the drawing). In this case, the upward direction is a direction away from the robot cleaner 1.

The control unit 20 determines whether or not a region including the current position of the robot cleaner 1 in the process of moving the second wall W2 forms a closed curve surrounded by a obstacle and the second wall W2.

When the first wall W1 is located as shown in FIG. 10, a region including the current position of the robot cleaner 1 (third identified region) is surrounded by an obstacle to form a closed curve.

On the other hand, when the second wall W2 is located as shown in FIG. 11, the region (fourth identified region) including the current position of the robot cleaner 1 includes the region connected to an uncleaned region. Therefore, the region (fourth identified region) including the current position of the robot cleaner 1 does not form a closed curve.

When a cleaning completed region in which the robot cleaner is currently located or a cleaning completed region in which the robot cleaner is not located forms a closed curve in the process of moving the second wall W2, the movement of the second wall W2 is stopped (the second wall is stopped at a second position). In FIG. 11, it is shown that the cleaning completed region located above the second wall W2 forms a closed curve.

That is, in the process of moving the second wall W2, a region connected to an uncleaned region exists between a first position of the second wall W2 and a second position of the second wall W2 at the time when the cleaning completed region in which the robot cleaner is currently located does not form a closed curve.

Therefore, the region between the second wall W2 at the first position and the second wall W2 at the second position is determined as the moving target region.

Next, the control unit 20 may determine a plurality of target coordinates TP1, TP2, TP3, and TP4 which the robot cleaner is to move on the determined moving target region as shown in FIG. 12. As an example, when the moving target region is formed in a rectangular shape or the like, the control unit 20 may determine the coordinates corresponding to the vertex of the moving target region as the target coordinate. In this case, when an obstacle exists in the target coordinates, the changed coordinates avoiding the obstacle may be determined as the target coordinates.

The control unit 20 determines a final coordinate to be finally moved among the determined plurality of target coordinates.

For example, as already described with reference to FIG. 5, the moving target region may be divided into four small regions by connecting the four target coordinates by a diagonal line. Next, a region having the largest area connected to the uncleaned region among the four small regions may be determined. In FIG. 12, for example, a lower region may be selected because a region connected to the uncleaned region exists in the lower region.

Then, the final coordinate may be selected based on the wall-following direction of the robot cleaner among the coordinates TP4 and TP3 included in the selected region. In the present embodiment, for example, the robot cleaner 1 is controlled to move along the right wall, so that TP4 may be selected as the final coordinate that is, a starting coordinate for the wall-following.

When TP4 is determined as the final coordinate as described above, the control unit 20 may control the driving unit 34 such that the robot cleaner 1 moves to the final coordinate TP4 within the moving target region from the current position as shown in FIG. 13.

When the robot cleaner 1 moves to the final coordinate, the control unit 20 may control the driving unit 34 such that the robot cleaner 1 performs the wall-following operation.

Figure 14:
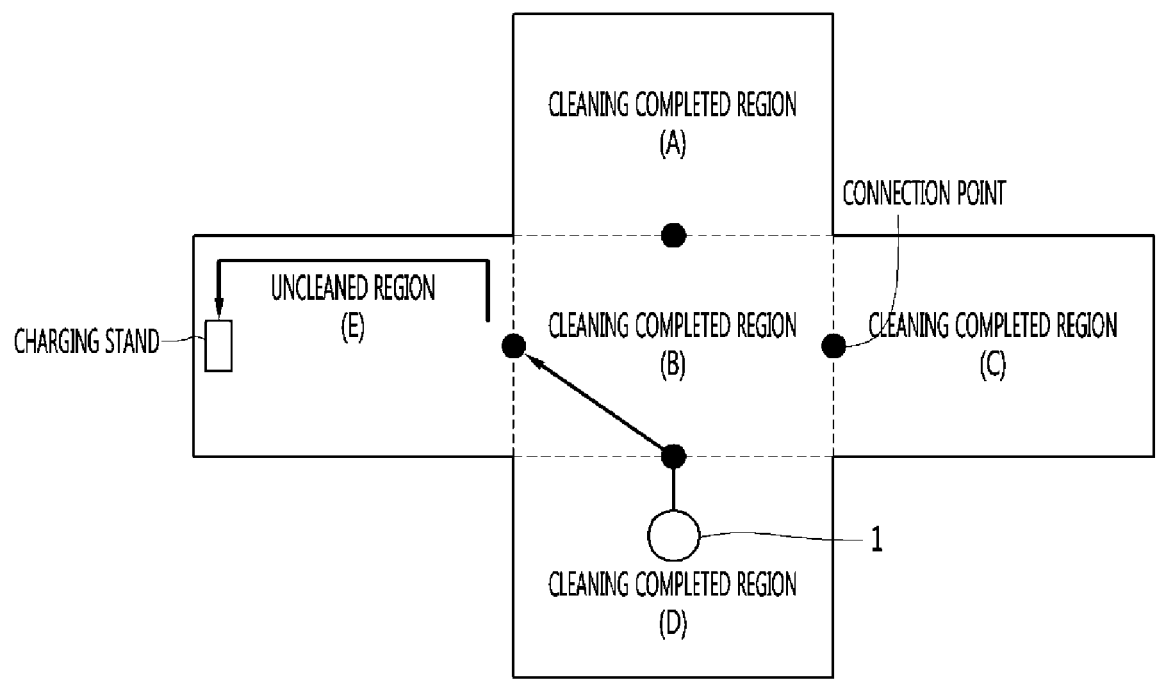
FIG. 14 is a diagram showing a third method of searching for a uncleaned region in a cleaning target region.

FIG. 14 is a diagram showing a third method of searching for a uncleaned region in a cleaning target region.

Referring to FIG. 14, the control unit 20 may divide the cleaning target region (entire region) into a plurality of small regions during cleaning or before starting cleaning.

For example, the control unit 20 may divide the cleaning target region into a plurality of small regions before starting the cleaning by traveling in the cleaning target region. The cleaning may be performed while sequentially moving to the plurality of small regions divided.

Alternatively, the cleaning may be performed while dividing the cleaning target region into a plurality of small regions.

In any case, the control unit 20 may create connection points on the boundary line between the small regions for smooth movement between the plurality of small regions, and may pass through the connection points when moving between the small regions. In this case, the generated connection points are stored in the storage unit 80.

When a condition for returning to a charging stand is satisfied while the robot cleaner 1 is cleaning a specific small region, the control unit 20 searches for a uncleaned region among the plurality of small regions and searches for a connection point (a point in the uncleaned region) on the boundary line included in the uncleaned region.

The boundary line included in the uncleaned region is, for example, the boundary line between the uncleaned region and the cleaning completed region.

For example, it is assumed that the cleaning target region is divided into regions A to E, among which cleaning for the regions A to D has been completed, and there is no charging stand in the regions where cleaning is completed. It is assumed that the robot cleaner 1 is currently located in the region D.

In this state, the control unit 20 searches for the region E, which is an uncleaned region, and searches for a connection point included in the region E in order to search for a charging stand.

The control unit 20 may control the driving unit 34 such that the robot cleaner 1 moves to the connection point of the boundary line included in the uncleaned region (the region E in FIG. 14). After the robot cleaner 1 moves to the connection point of the boundary line included in the uncleaned region, the control unit 20 controls the driving unit 34 such that the robot cleaner 1 performs wall-following in the uncleaned region.

When there are a plurality of uncleaned regions among the plurality of small regions, the control unit 20 may control the driving unit 34 such that the robot cleaner 1 sequentially moves to the plurality of uncleaned regions.

According to the embodiment, since the robot cleaner may travel to the uncleaned region immediately without traveling through the cleaning completed region, a travel distance of the robot cleaner is reduced in the process of searching for the charging stand, and accordingly, a time for searching for the charging stand is reduced.

The invention claimed is:

1. A robot cleaner comprising:
    a body that includes a driving device to move the body;
    a position recognition unit provided in the body and configured to determine a position of the body;
    a storage configured to store information regarding a map, the information regarding the map including a cleaning completed region; and
    a controller configured to control the driving device, wherein the controller is configured to:
        determine whether a charging stand is located within the cleaning completed region based on the stored map when the robot cleaner satisfies a return condition to return to the charging stand,
        search for an uncleaned region on the stored map when the charging stand is determined, based on the stored map, to not be located within the cleaning completed region,
        control the driving device such that the body moves from a current position to a specific point with regard to the uncleaned region, and
        in response to the body moves from the current position to the specific point, control the driving device such that the body performs wall-following to search for the charging stand.

2. The robot cleaner of claim 1, wherein the specific point is a point at a boundary between the uncleaned region and the cleaning completed region.

3. The robot cleaner of claim 1, wherein the controller divides a cleaning target region into a plurality of small regions, and controls the driving device such that the body performs cleaning on each of the small regions, and
    wherein the uncleaned region is a small region, from among the plurality of small regions, in which cleaning is not completed.

4. The robot cleaner of claim 3, wherein the controller controls the driving device to perform wall-following in the uncleaned region and to search for the charging stand.

5. The robot cleaner of claim 4, wherein, when a plurality of uncleaned regions are provided among the plurality of small regions, the controller controls the driving device to search for the charging stand while moving to each of the plurality of uncleaned regions in a sequential manner.

6. The robot cleaner of claim 1, wherein the specific point is at a moving target region which includes a region connected to the uncleaned region.

7. The robot cleaner of claim 6, wherein the moving target region is a region in which cleaning is completed.

8. The robot cleaner of claim 6, wherein the controller determines a plurality of target coordinates of the moving target region and determines a target coordinate adjacent to a region connected to the uncleaned region, from among the plurality of target coordinates.

9. The robot cleaner of claim 6, wherein the controller determines a plurality of target coordinates of the moving target region, divides the moving target region into a plurality of small regions based on lines connecting the plurality of target coordinates, and selects a small region including a region connected to the uncleaned region, from among the plurality of small regions, and controls the driving device such that the robot cleaner moves to one target coordinate from among two target coordinates included at the small region.

10. The robot cleaner of claim 9, wherein, when a plurality of regions are connected to the uncleaned region, the controller selects a small region having a largest area, from among the regions connected to the uncleaned region, and controls the driving device such that the robot cleaner moves to one of the two target coordinates included at the selected small region.

11. The robot cleaner of claim 9, wherein the plurality of target coordinates are vertex coordinates of the moving target region.

12. The robot cleaner of claim 11, wherein, when an obstacle exists at the vertex coordinates, the controller determines a changed position for avoiding the obstacle as the target coordinates.

13. The robot cleaner of claim 1, wherein, when the body enters a cleaning completed region while performing the wall following, the controller researches on the stored map for another uncleaned region, and controls the driving device such that the body moves to another specific point with regard to the another uncleaned region.

14. A control method of a robot cleaner, comprising:
    performing, by the robot cleaner, cleaning while being navigated;
    determining a return condition to return the robot cleaner to a charging stand is satisfied;
    determining the charging stand is not located within a cleaning completed region based on a stored map when the return condition is determined to be satisfied; and
    searching for an uncleaned region on the stored map when the charging stand is determined, based on the stored map, to not be located within the cleaning completed region, and controlling the robot cleaner such that the robot cleaner moves from a current position to a specific point with regard to the uncleaned region, and
    in reponse to the robot cleaner moves from the current position to the specific point, performing, by the robot cleaner, wall-following to search for the charging stand.

15. The control method of claim 14, further comprising:
    when the robot cleaner enters a cleaning completed region while performing the wall-following, re-searching on the stored map for another uncleaned region; and
    moving, by the robot cleaner, to a specific point with regard to the another uncleaned region.

16. The control method of claim 14, wherein the performing of the cleaning includes dividing, by the robot cleaner, a cleaning target region into a plurality of small regions and performing cleaning on each of the small regions, and
    wherein the uncleaned region is a small region, from among the plurality of small regions, in which cleaning is not completed.

17. The control method of claim 16, wherein the specific point is a point at a boundary between the uncleaned region and the cleaning completed region.

18. The control method of claim 14, wherein the specific point is a point within the uncleaned region or a point adjacent to the uncleaned region.

* * * * *